(12) United States Patent
Morikawa et al.

(10) Patent No.: US 6,233,391 B1
(45) Date of Patent: May 15, 2001

(54) DIGITAL VIDEO RECORDER

(75) Inventors: Shigekazu Morikawa, Hirakata; Ayumu Okutani, Kashihara, both of (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/149,047

(22) Filed: Sep. 8, 1998

(30) Foreign Application Priority Data

Sep. 9, 1997 (JP) .................................................... 9-243262

(51) Int. Cl.⁷ ...................................................... H04N 5/91
(52) U.S. Cl. ............................................... 386/67; 386/124
(58) Field of Search ................................. 386/46, 67, 68, 386/112, 107, 117, 109, 124; 358/906; 369/60

(56) References Cited

U.S. PATENT DOCUMENTS 5,432,769 * 7/1995 Honjo ...................................... 369/60
5,615,017 * 3/1997 Choi ....................................... 386/109

FOREIGN PATENT DOCUMENTS

| 1-296869 | 11/1989 | (JP) . |
| 6-236502 | 8/1994 | (JP) . |
| 6-261284 | 9/1994 | (JP) . |

* cited by examiner

Primary Examiner—Huy Nguyen
(74) Attorney, Agent, or Firm—Armstrong, Westerman, Hattori, McLeland & Naughton, LLP (57) ABSTRACT

A digital video recorder which intermittently records digital video signals, including a memory capable of storing digital video signals a tape running mechanism and a control circuit for controlling the operations of the memory and the mechanism. The digital video signals are thinned with a constant cycle of intermittent recording, the thinned signals are written to the memory. When the memory has been filled to a predetermined capacity, a magnetic tape is caused to start to run, and the digital video signals are read from the memory and recorded on the tape. When the memory is emptied by signal reading to afford the predetermined capacity, the tape is brought to a stop.

5 Claims, 6 Drawing Sheets

DIGITAL VIDEO RECORDER

BACKGROUND OF THE INVENTION

1. Field of the Invention

The present invention relates to video recorders for use with a magnetic tape or similar recording medium for intermittently recording thereon video signals obtained from a monitoring TV camera installed, for example, at the entrance of a bank, commodity store or house.

2. Description of the Related Art

Generally with video recorders of the helical scan type, the signal bearing surface of a magnetic tape running in one direction is traced in an oblique direction with a magnetic head to record a series of video signals on a plurality of tracks thereby formed on the signal bearing surface. Since the video recorder connected to a monitoring TV camera records video signals on a magnetic tape of given length over a long period of time, the video signals obtained by the camera are recorded "intermittently," i.e., as thinned out in a predetermined cycle, on the magnetic tape.

For intermittent recording, digital video recorders can be used which are adapted to digitize the analog video signals obtained by a TV camera and record the digital signals on a magnetic tape.

Figure 6:
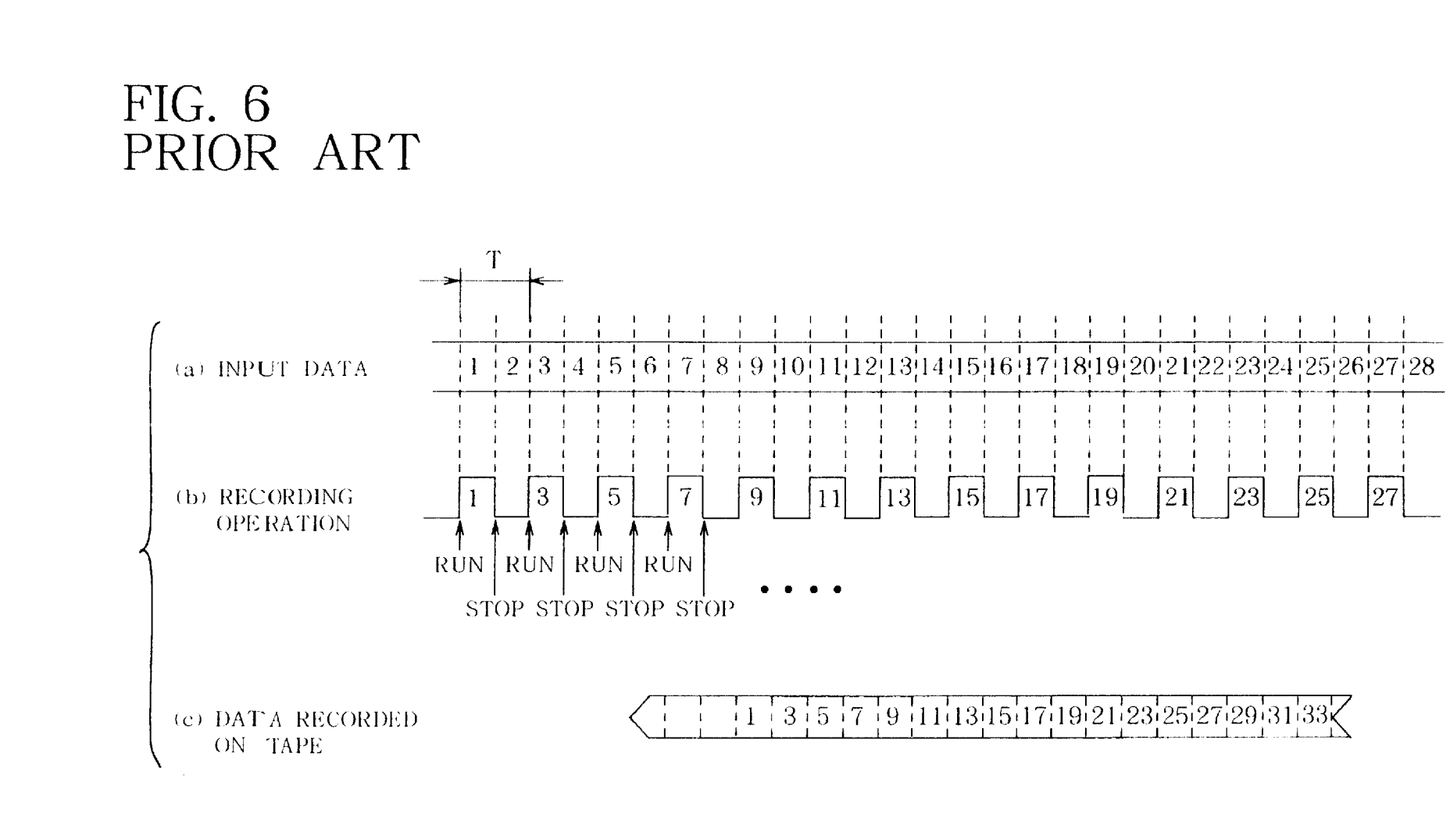
FIG. 6 is a time chart showing operations of a conventional video recorder in its recording mode.

FIG. 6 shows a processing example wherein digital video signals which are sequential in time are intermittently recorded on a magnetic tape to obtain a recording time twice the real time. In the case where items of time series data 1, 2, 3, 4, . . . are input which are obtained by dividing a series of digital video signals into frames or groups each comprising a plurality of frames as shown in FIG. 6($a$), these items of input data are recorded on the magnetic tape, with every other data unit thinned out with a cycle T as shown in FIG. 6($c$)

In this case, the magnetic tape repeats running and stopping alternating in a cycle of T/2 as shown in FIG. 6($b$) to record images during running.

In this intermittent recording operation, however, the running and stopping of the magnetic tape alternate in repetition with a cycle shorter than the cycle T of intermittent recording, so that the tape fails to travel with stability every time. Consequently, the head traces the tape at an angle different from the head trace angle of the normal recording operation.

Accordingly, playback of the magnetic tape used for intermittent recording requires a complex procedure such as altering the head trace angle in conformity with the head trace angle used for recording. Especially in the case of digital video recorders, normal reproduction of images requires accurate reproduction of data permitting correction of errors, whereas if head tracing involves an angular deviation in playing back the magnetic tape used for intermittent recording, there arises a problem in that the recorded data can not be read from the tape accurately, failing to afford a normal reproduction.

SUMMARY OF THE INVENTION

An object of the present invention is to provide a digital video recorder which is capable of intermittently recording digital video signals at an accurate head trace angle.

The present invention provides a digital video recorder including a signal recording system comprising:

memory means capable of storing therein digital video signals available over a period of time longer than the cycle of intermittent recording;

writing control means for extracting digital video signals for one or a plurality of frames with the cycle of intermitting recording and writing the extracted digital video signals to the memory means during the extraction; and recording control means for controlling reading of digital video signals from the memory means, running of a recording medium and recording of digital video signals on the recording medium, the recording control means being adapted to repeat the operations of causing the recording medium to start to run, reading digital video signals from the memory means and recording the read signals on the recording medium when a predetermined quantity of digital video signals have been written to the memory means, and bringing the recording medium to a stop and ceasing recording on the recording medium when the predetermined quantity of digital video signals have been read from the memory means.

With the digital video recorder of the present invention, the digital video signals extracted with the cycle of intermittent recording are written to the memory means to a predetermined capacity, thereafter read from the memory means and recorded on the recording medium, and these operations are repeated, so that the recording medium can be kept running while the signals are being read from the memory means. After the recording medium is brought to a stop when all the digital video signals in the memory means have been read therefrom, the recording medium can be held at a halt until the memory means is filled with digital video signals written thereto.

Because the memory means has a capacity to store therein digital video signals which are available over a period of time longer than the cycle of intermittent recording, the period of time during which the recording medium can be kept running or at a halt is sufficiently longer than the cycle of intermittent recording, in corresponding relation with the storage capacity of the memory means.

Accordingly, the recording medium is caused to run and stopped less frequently than in the conventional video recorder which is adapted for intermittent recording without using a memory means, consequently minimizing the deviation of the head during tracing due to unstable travel of the recording medium.

More specifically, the writing control means determines the cycle of intermittent recording in accordance with time data contained in an intermittent recording command to be input from outside.

This makes it possible to lengthen the recording time for the medium in a desired ratio.

As an embodiment of the invention, the digital video recorder further includes a signal reproduction system for causing the recording medium having digital video signals intermittently recorded thereon to run at the same speed as when recording the signals and reproducing the digital video signals from the recording medium.

The signal reproduction system comprises:

memory means capable of storing digital video signals therein, and reproduction control means for controlling reproduction of digital video signals from the recording medium, running of the recording medium, and writing and reading of digital video signals to and from the memory means, the reproduction control means being adapted to repeat the operations of stopping the recording medium when a predetermined quantity of digital video signals have been written to the memory means, and causing the recording medium to run when the predetermined quantity of digital video signals have been read from the memory means, the reproduction control means being operable to output the digital video signals read from the memory means while repeating the operations.

The memory means of the signal recording system is usable as the memory means of this system in common.

While the recording medium is repeatedly run and stopped in the digital video recorder having the signal reproduction system, the digital video signals reproduced from the medium is written to the memory means to a predetermined capacity, and in the meantime, the digital video signals are read from the memory means at a given rate and output, so that the recording medium can be kept running during the period in which the signals are written to the memory means.

Accordingly, the recording medium is run and stopped less frequently than in the conventional video recorder which reproduces signals without using a memory means, consequently minimizing the deviation of the head during tracing due to unstable travel of the recording medium.

More specifically, the reproduction control means determines the rate of reading signals from the memory means in accordance with reproduction rate data contained in an intermittent reproduction command to be input from outside.

This realizes the desired reproduction rate.

Digital video signals can be intermittently recorded with higher stability at a more accurate head trace angle by the digital video recorder of the invention than by conventional devices.

DETAILED DESCRIPTION OF THE PREFERRED EMBODIMENT

With reference to the drawings, a detailed description will be given of a digital video recorder adapted for use with a monitoring TV camera and embodying the invention.

Figure 1:
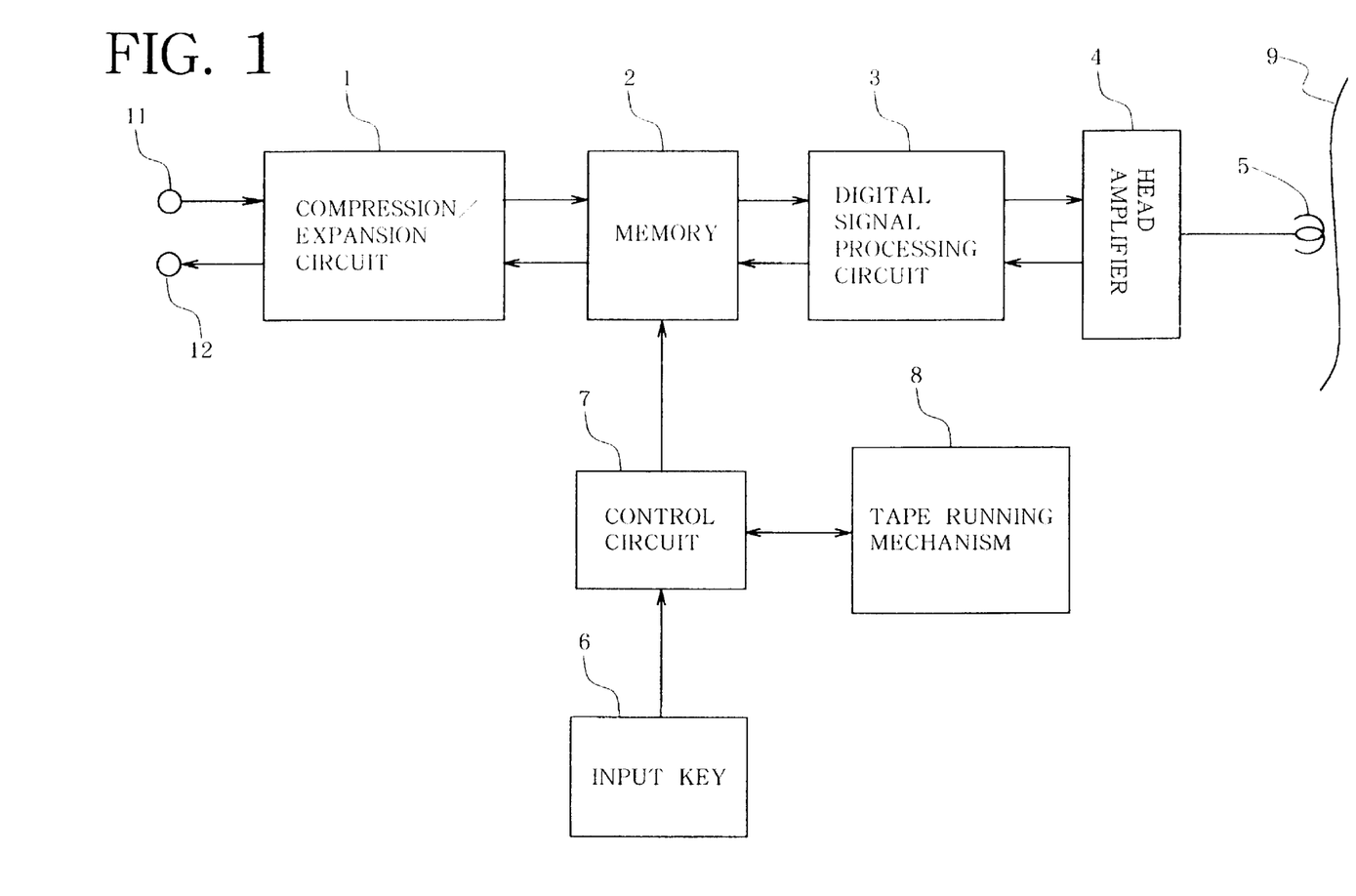
FIG. 1 is a block diagram showing the construction of a digital video recorder according to the invention.

As shown in FIG. 1, the digital video recorder according to the present invention comprises a signal recording system extending from a video input terminal 11 to a magnetic head 5, and a signal reproduction system extending from the magnetic head 5 to a video output terminal 12. A magnetic tape 9 is driven for running by a tape running mechanism 8 under the control of a control circuit 7.

An input key 6 is connected to the control circuit 7. The recorder can be set in a recording mode for intermittent recording or in a playback mode for intermittent reproduction by manipulating the input key 6.

In the recording mode for intermittent recording, digital video signals are input via the video input terminal 11 to a compression/expansion circuit 1 for data compression and thereafter written to a memory 2 under the control of the control circuit 7. The digital video signals are read from the memory 2 under the control of the control circuit 7, then fed to a digital signal processing circuit 3 for required signal processing, subsequently sent to a head amplifier 4 for amplification, thereafter fed to the magnetic head 5 and recorded on the magnetic tape 9.

Alternatively in the playback mode for intermittent reproduction, the digital video signals recorded on the tape 9 are read by the magnetic head 5, amplified by the head amplifier 4, then fed to the digital signal processing circuit 3 for required signal processing and thereafter written to the memory 2 under the control of the control circuit 7. The digital video signals are read from the memory 2 under the control of the circuit 7, fed to the compression/expansion circuit 1 for data expansion and subsequently delivered from the video output terminal 12.

Figure 2:
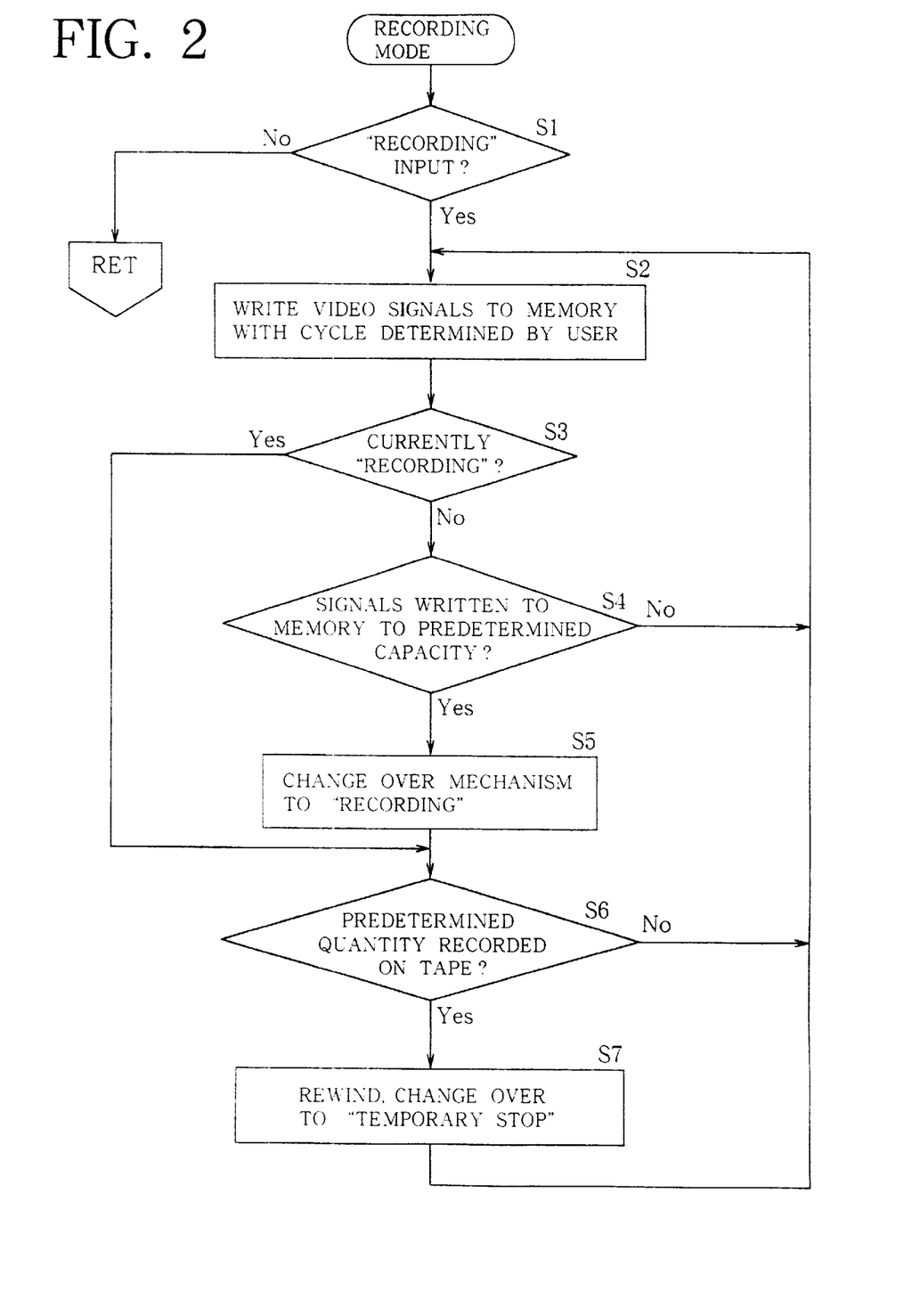
FIG. 2 is a flow chart showing the control procedure to be executed in a recording mode.

FIG. 2 shows the procedure to be performed by the control circuit when the recorder is set in the recording mode for intermittent recording.

An inquiry is first made in step S1 as to whether a "recording" command has been keyed in for setting the recorder in the recording mode for intermittent recording. When the answer is affirmative, step S2 follows to write digital video signals to the memory with a cycle determined by the user.

This step can be such that when the user inputs the recording time to be realized with a magnetic tape of given length, the control circuit calculates a required cycle of intermittent recording corresponding to the time.

Subsequently, an inquiry is made in step S3 as to whether the recorder is currently in recording operation. If the answer is negative, the sequence proceeds to step S4 to inquire whether a predetermined quantity of digital video signals have been written to the memory. When the inquiry is answered in the affirmative, the mechanism is changed over to the recording mode in step S5.

An inquiry is thereafter made in step S6 as to whether the predetermined quantity of digital video signals have been recorded on the tape. When the answer is affirmative, step S7 follows in which the tape is rewound by a small amount, and the mechanism is then changed over to a temporary stop mode. The sequence then returns to step S2.

If on the other hand the inquiry of step S3 is answered in the affirmative, step S6 follows. When the inquiry of step S4 or step S6 is answered in the negative, the sequence returns to step S2.

Figure 4:
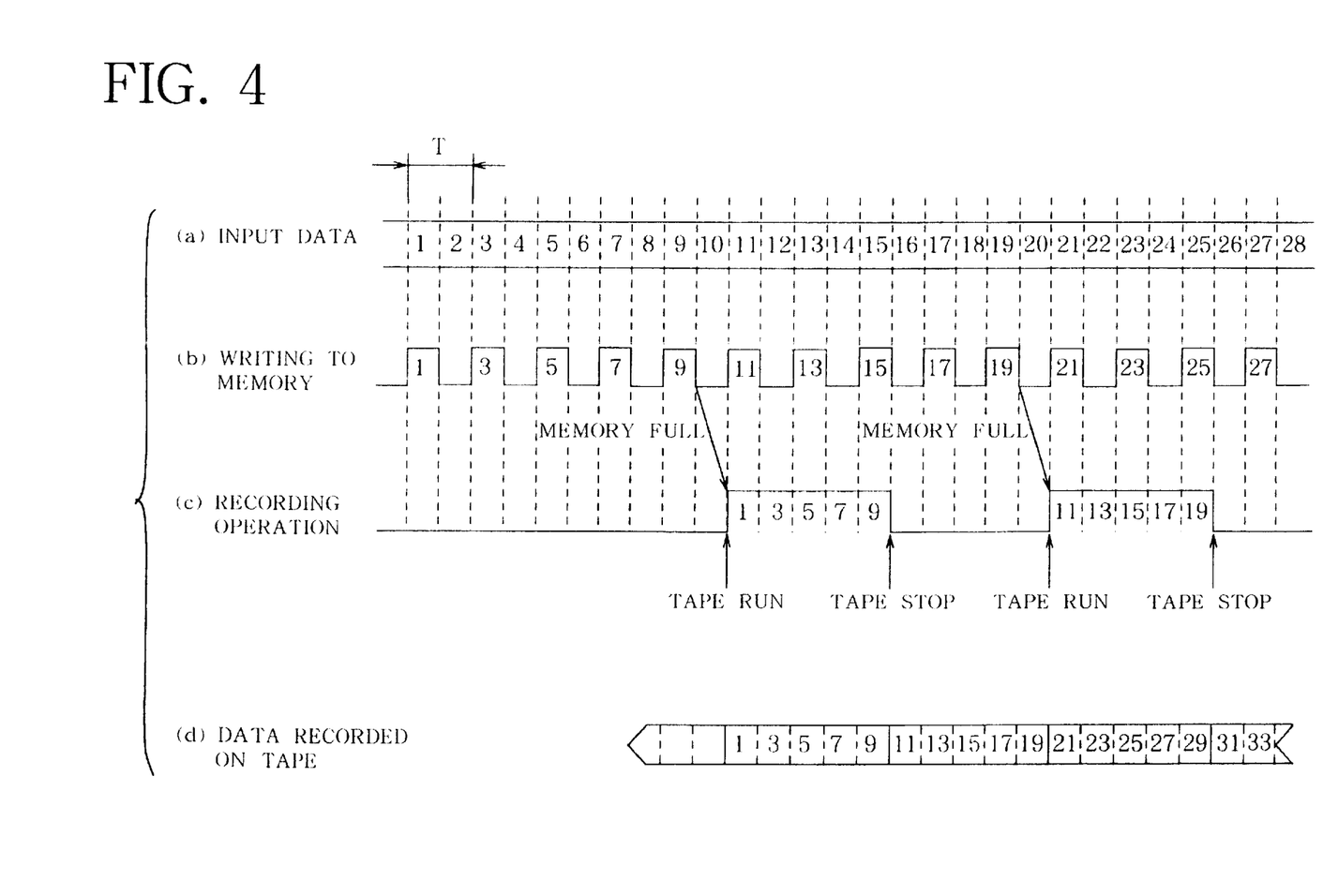
FIG. 4 is a time chart showing operations in the recording mode.

FIG. 4 shows how digital video signals are intermittently recorded in the recording mode.

With reference to FIG. 4(a), in the case where a series of digital video signals, as divided into frames or groups each comprising a plurality of frames, are input as items of time series data 1, 2, 3, 4, . . . , these items of input data are intermittently recorded on the magnetic tape as shown in FIG. 4(d), with every other data unit thinned out with a cycle T to realize a recording time twice the real time.

In this case, the input data is written to the memory with the cycle T, with every other data unit thinned out by the extraction of step S2 described as shown in FIG. 4(b).

When the digital video signals (1, 3, 5, 7, 9) have been written to the memory to a predetermined (full) capacity, the inquiry of step S4 is answered in the affirmative, followed by the start of tape running and recording on the tape in step S5 as shown in FIG. 4(c).

All the digital video signals (1, 3, 5, 7, 9) are then read from the memory and recorded on the tape, whereupon the inquiry of step S6 is answered in the affirmative to stop the tape and recording operation as seen in FIG. 4(c).

By repeating the procedure described, the digital video signals (1, 3, 5, 7, 9, 11, . . . ) are successively recorded on the magnetic tape as shown in FIG. 4(d), with every other data unit thinned out.

The intermittent recording operation enables the magnetic tape to run with higher stability than conventionally to assure an accurate head trace angle because the tape is repeatedly run and stopped less frequently than in the prior art (with one-fifth the conventional frequency in the case of FIG. 4).

Figure 3:
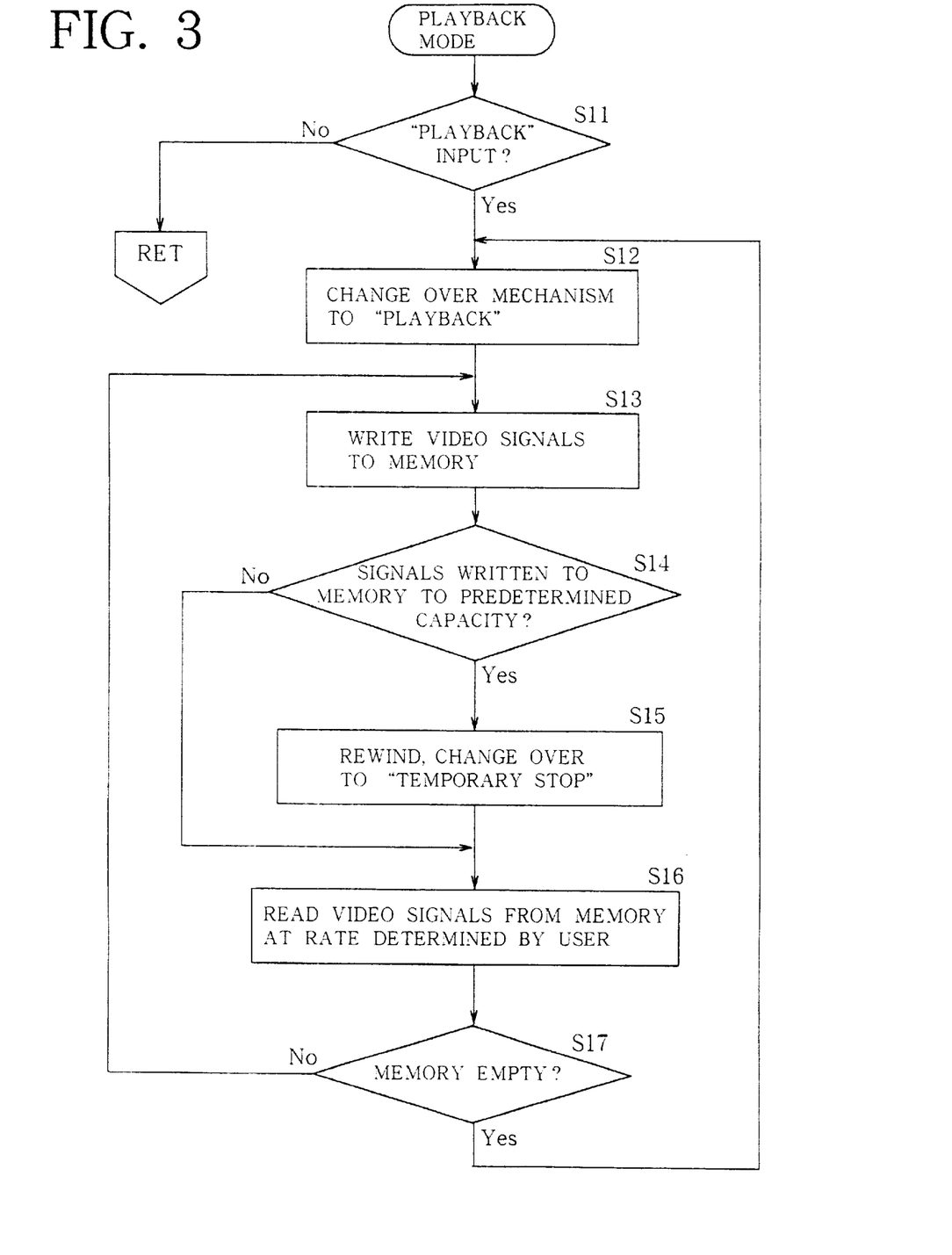
FIG. 3 is a flow chart showing the control procedure to be executed in a playback mode.

FIG. 3 shows the procedure to be executed by the control circuit when the recorder is set in the playback mode for intermittent reproduction.

An inquiry is first made in step S11 as to whether a "playback" command has been keyed in for setting the recorder in the playback mode for intermittent reproduction. When the answer is affirmative, step S12 follows to change over the mechanism to the playback mode.

Subsequently, step S13 starts to write digital video signals to the memory, followed by step S14 in which an inquiry is made as to whether the digital video signals have been written to the memory to the predetermined (full) capacity. If the answer is affirmative, the magnetic tape is rewound by a small amount, and the mechanism is then changed over to the temporarily stop mode in step S15.

Step S16 then starts to read the digital video signals from the memory at a rate determined by the user. An inquiry is thereafter made in step S17 as to whether the memory is empty. The sequence returns to step S12 if the answer is affirmative.

When the inquiry of step S14 is answered in the negative, step S16 follows. Further if the answer to the inquiry of step S17 is negative, step S13 follows again.

Figure 5:
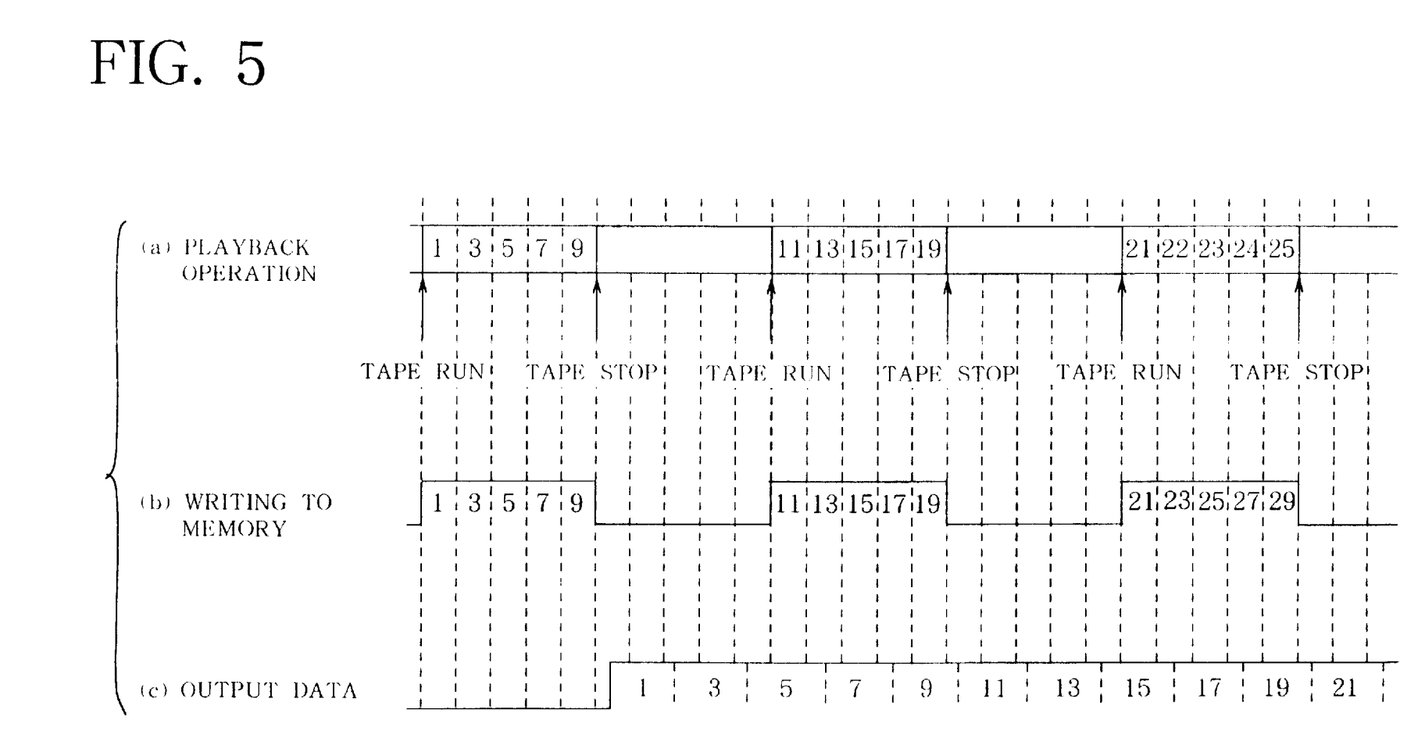
FIG. 5 is a time chart showing operations in the playback mode.

FIG. 5 shows the playback mode as executed, i.e., how the digital video signals intermittently recorded on the magnetic tape are intermittently reproduced by repetitions of tape running and stopping and thereafter output at the specified reproduction rate.

With reference to FIG. 5(a), the tape is repeatedly run and stopped, and the digital video signals (1, 3, 5, 7, 9, 11, . . . ) recorded on the tape are intermittently reproduced during the tape running periods. The reproduced digital video signals are successively written to the memory in step S13. Consequently, the memory is found to be filled with a predetermined quantity of digital video signals (1, 3, 5, 7, 9) to the full in step S14, whereupon the tape is brought to a stop.

The group of digital video signals (1, 3, 5, 7, 9) written to the memory are successively read from the memory and output as shown in FIG. 5(c) at the reproduction rate specified by the user in step S16.

When the memory is emptied of the digital video signals by reading, this state is recognized in step S17, whereupon the tape resumes running to start to write digital video signals (11, 13, 15, 17, 19) to the memory as illustrated in FIG. 5(b).

In this way, a group of digital video signals are written to and read from the memory repeatedly, whereby a series of digital video signals (1, 3, 5, 7, 9, 11, . . . ) is output from the memory as shown in FIG. 5(c).

During the intermittent reproduction operation described, the magnetic tape is merely run and stopped repeatedly at a time interval in accordance with the capacity of the memory, and is therefore run and stopped less frequently than in the conventional video recorder adapted for intermittent playback without using a memory. This assures stabilized travel of the magnetic tape and an accurate head trace angle.

In the foregoing intermittent recording operation and intermittent reproduction operation described, the magnetic tape is rewound by a small amount before being brought to a halt. This produces an overlap in the data stored in the memory, whereas the data overlap is disposed of to realize normal recording or reproduction of signals despite variations in the tape speed which occur immediately after the tape resumes its travel.

The device of the invention is not limited to the foregoing embodiment in construction but can be modified variously by one skilled in the art without departing from the spirit of the invention as set forth in the appended claims.

What is claimed is:

1. A digital video recorder including a signal recording system for intermittently recording on a tape recording medium digital video signals which are sequential in time, comprising:

memory means having a capacity for storing therein digital video signals available over a period of time longer than a constant cycle of internitting recording;

writing control means for thinning out digital video signals for one or a plurality of frames with the constant cycle of intermitting recording and writing the thinned digital video signals to the memory means during the thinning; and recording control means for controlling reading of digital video signals from the memory means, running of the recording medium and recording of digital video signals on the recording medium, the recording control means being adapted to repeat the operations of causing the recording medium to start to run, reading digital video signals from the memory means and recording the read signals on the recording medium when a predetermined quantity of digital video signals have been written to the memory means, and bringing the recording medium to a stop and ceasing recording on the recording medium when the predetermined quantity of digital video signals have been read from the memory means.

2. A digital video recorder according to claim 1, wherein the writing control means determines the constant cycle of intermittent recording in accordance with time data contained in an intermittent recording command to be input from outside.

3. A digital video recorder according to claim 1, which further includes a signal reproduction system for causing the recording medium having digital video signals intermittently recorded thereon to run at the same speed as when recording the signals and reproducing the digital video signals from the recording medium.

4. A digital video recorder according to claim 3, wherein the signal reproduction system comprises:

memory means capable of storing digital video signals therein; and reproduction control means for controlling reproduction of digital video signals from the recording medium, running the recording medium, and writing and reading of digital video signals to and from the memory means, the reproduction control means being adapted to repeat the operations of stopping the recording medium when a predetermined quantity of digital video signals have been written to the memory means, and causing the recording to run when the predetermined quantity of digital video signals have been read from the memory means, the reproduction control means being operable to output the digital video signals read from the memory means while repeating the operations.

5. A digital video recorder according to claim 4, wherein the reproduction control means determines the rate of reading signals from the memory means in accordance with reproduction rate data contained in an intermittent reproduction command to be input from outside.

* * * * *